Figure 1:
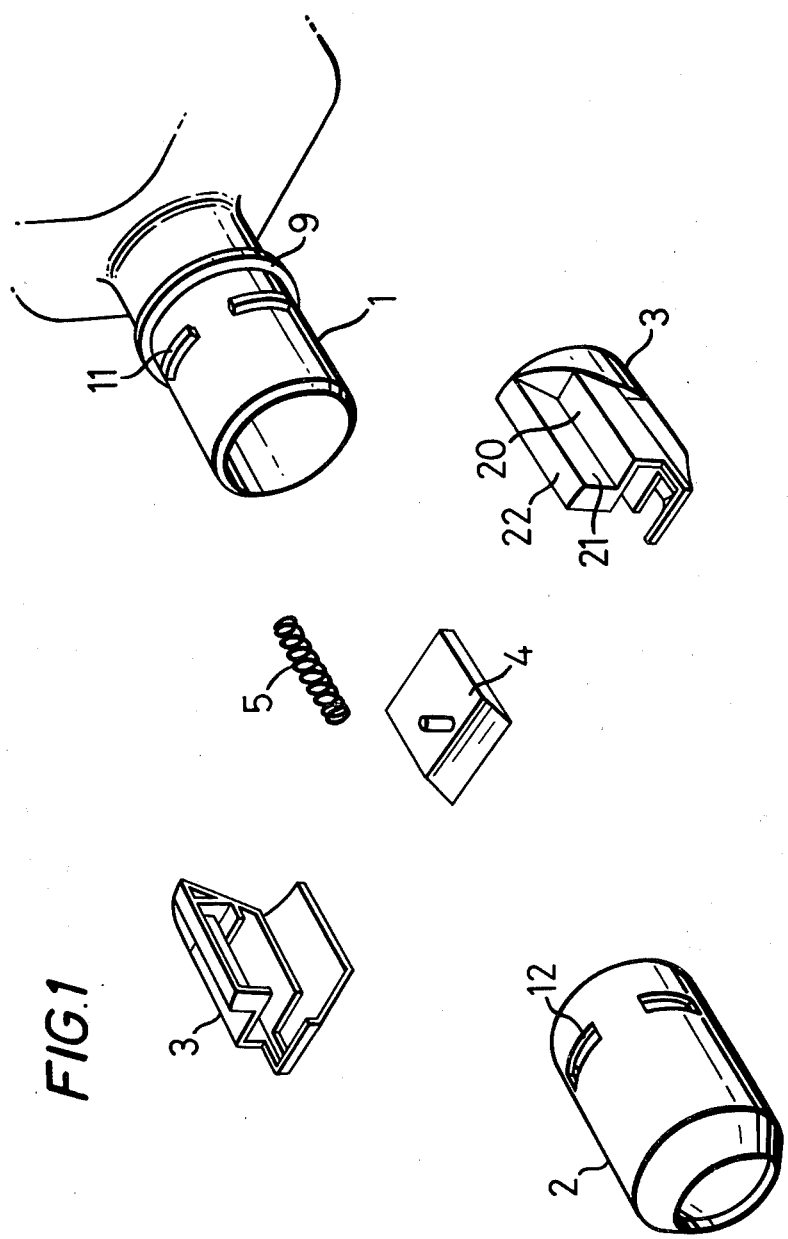

United States Patent [19]

Loader

[11] Patent Number: 4,466,559
[45] Date of Patent: Aug. 21, 1984

[54] VALVES FOR CONTROLLING DISPENSATION OF FLUID MATERIAL

[76] Inventor: Brian K. Loader, 97 Pams Way, Ewell, Surrey KT19 0HN, England

[21] Appl. No.: 294,069

[22] Filed: Aug. 18, 1981

[30] Foreign Application Priority Data

Apr. 29, 1981 [GB] United Kingdom ................ 8113175

[51] Int. Cl.³ ............................................ B67D 3/00
[52] U.S. Cl. .................................. 222/196; 222/504; 222/511; 222/559
[58] Field of Search ............... 222/243, 504, 511, 512, 222/518, 559, 196, 199, 200, 561; 251/139, 141

[56] References Cited

U.S. PATENT DOCUMENTS

| | | | |
|---|---|---|---|
| 1,189,021 | 6/1916 | Van Houten | 222/559 |
| 2,640,630 | 6/1953 | Genco | 222/559 |
| 2,948,437 | 8/1960 | Nielsen | 222/561 |
| 3,036,739 | 5/1962 | Kamysz | 222/504 |
| 3,204,832 | 9/1965 | Barber | 222/504 |
| 4,346,824 | 8/1982 | Miller et al. | 222/504 |

FOREIGN PATENT DOCUMENTS 2222369 12/1972 Fed. Rep. of Germany ...... 222/504

*Primary Examiner*—H. Grant Skaggs
*Attorney, Agent, or Firm*—Cushman, Darby & Cushman

[57] ABSTRACT

A valve for controlling the dispensation of fluid material includes a dispensing passage and an outlet gate from the passage, the outlet gate being disposed relative to the dispensing passage such that material passing through the passage deviates to one side to pass through the outlet gate; and a valve operating member which includes a blade supported for movement in a path across the outlet gate and movable between positions in which respectively, the outlet gate is open and the outlet gate is obturated by the blade.

7 Claims, 2 Drawing Figures

VALVES FOR CONTROLLING DISPENSATION OF FLUID MATERIAL

This invention relates to valves for controlling dispensation of fluid material. The valves are particularly, but not exclusively, applicable to vending machines that dispense beverages.

Vending machines for beverages typically include a number of containers of powdered ingredients. These containers are usually aligned in succession, each containing a separate ingredient, for example, coffee, sugar, milk and chocolate in powdered form. The machine when operated by a customer dispenses a measured amount of each of the appropriate ingredient into a cup and then adds hot water to the mixture.

The powdered ingredients are often contained in plastics containers that are inverted in the vending machine and attached at their necks, to valve assemblies. The valves that are customarily used are ball valves in which a steel ball is supported by a seat over an outlet orifice. An upper valve body portion is attached to the valve seat by a spacing sleeve which determines the volume enclosed by the valve body. These parts are all enclosed by an outer sleeve attached to the valve seat. The parts are moulded from high-density plastics material apart from the steel ball. The ball is displaced from its seat to operate the valve by a magnetic field generated by an external coil. When operated the ball closes the outlet from the container so that only the measure of powdered ingredient within the valve body is dispensed.

This type of valve has several undesirable characteristics. One is that the amount of material dispensing in one operation can only be varied by taking the valve apart and modifying the spacing between the valve seat and the upper body portion. Second, it is vulnerable to the pilfering of ingredients by persons pushing the ball off its seat with a probe inserted through the outlet orifice of the valve.

It is an object of the present invention to provide a valve for controlling dispensation of fluid material, at least some forms of which may be constructed to overcome the aforementioned disadvantages.

According to the present invention, there is provided a valve for controlling the dispensation of fluid material comprising:

conduit means defining a dispensing passage and an outlet gate from the passage, the outlet gate being disposed relative to the dispensing passage such that material passing through said passage deviates to one side to pass through the outlet gate; and a valve operating member comprising a blade supported for movement in a path across said outlet gate and movable between positions in which respectively, the outlet gate is open and the outlet gate is obturated by the blade.

It will be appreciated that in this arrangement the path of movement of the blade has at least a component in the direction of flow of the material in the conduit. This feature may be exploited by disposing the valve such that both the flow of material and movement of the blade in one direction along its path are assisted by gravity.

In a preferred embodiment, the centre of mass of the blade when it obturates the outlet gate is lower than when the blade is in its position which opens the outlet gate.

The present invention also provides a beverage dispensing machine incorporating a valve as aforesaid attached to a container of powdered or particulate ingredients.

In such or other application the blade may be arranged to present its edge in a downwards direction towards a station at which material is dispensed to a user. In this disposition it is thus difficult for a would-be pilferer to manipulate the blade from below and release the material behind the blade.

A valve seat for the blade may be provided by a ledge extending from the lower periphery of the outlet gate, the ledge thus limiting the travel of the blade and supporting it in its obturating position.

In a beverage dispensing machine or other application of the valve this ledge which forms the valve seat may also serve to shield at least partially, the moving blade from tampering from below.

Embodiments of the invention will now be described, by way of example only, with reference to the accompanying drawings.

Figure 2:
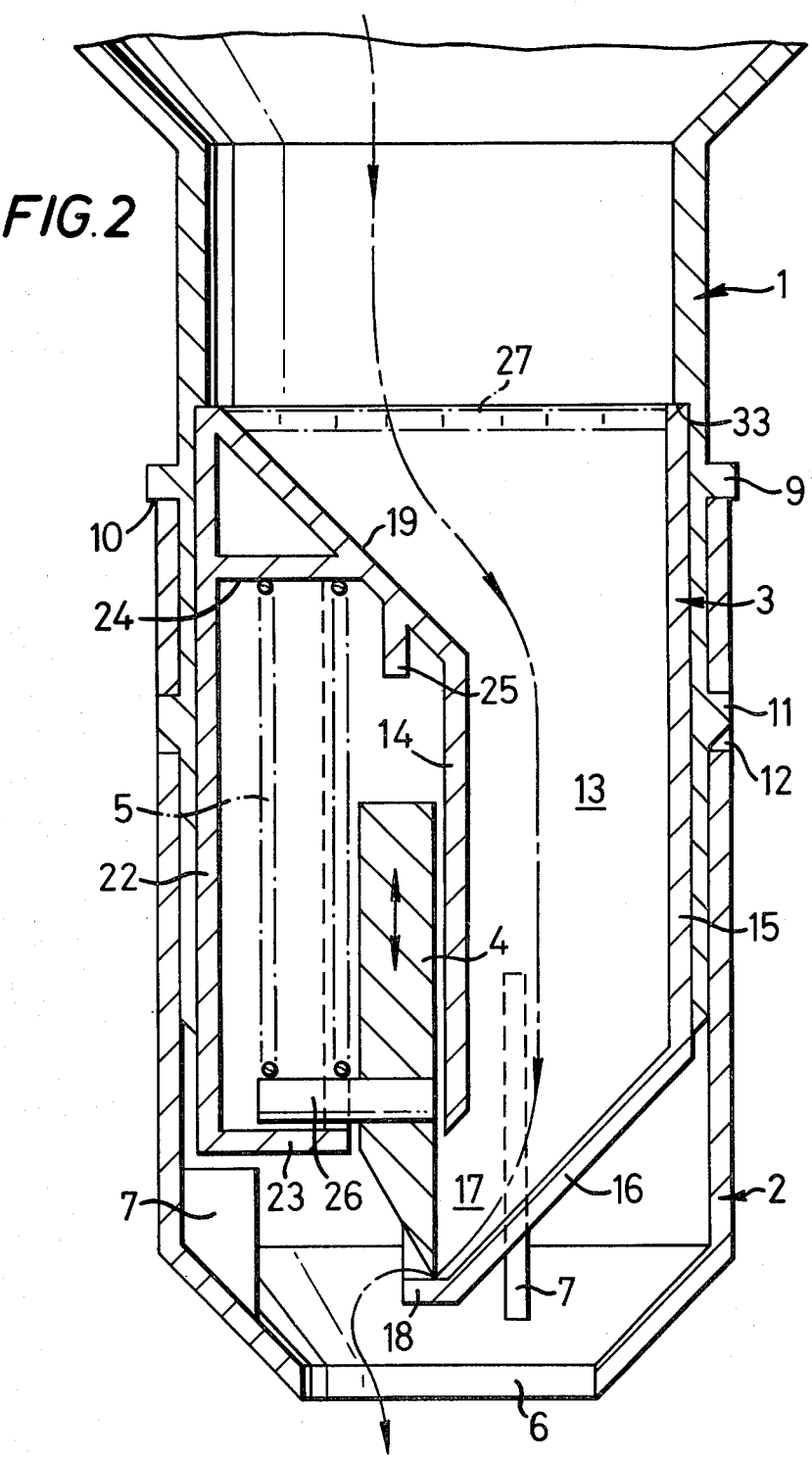

In the drawings:

FIG. 1 is an exploded view of part of a valve assembly for a vending machine; and FIG. 2 is an axial section through the assembled valve.

Referring to the Figures, a valve assembly and ingredients container for a vending machine are attached by means of an interconnection between parts of the valve assembly and a tubular neck 1 of the container.

The valve assembly comprises an outer sleeve 2, and inner blade holder 3, a movable blade 4 and a coil spring 5. The outer sleeve is cylindrical along the major part of its length, but narrows at one end, forming a frustoconical end portion which terminates in a circular outlet orifice 6.

The container is installed in a vending machine with its neck and the valve assembly vertically disposed beneath it; that is, with the longitudinal axis of the outer sleeve 2 also vertical. In the following description, the neck of the container and the valve assembly will be considered in their operative dispositions.

In the region of the outer sleeve where the frustoconical and cylindrical parts meet there are three inwardly-extending locating fins 7. These fins are of different vertical extent, and each has an upper horizontal edge e.g. 8 extending from the inner wall of the outer sleeve. These edges form locating and supporting abutments for the blade holder 3.

The neck 1 of the ingredients container is tubular and has a slightly smaller diameter than that of the outer sleeve 2 of the valve assembly; this enables the neck to fit closely within the outer sleeve. The neck of the container has a circular, external flange 9 situated approximately one third of the way along its length down from the ingredients container. This flange extends around the outer surface of the neck, and its lower annular surface 10 limits the insertion of the neck into the outer sleve of the valve assembly. When the container neck is inserted into the outer sleeve, the upper circular end surface of the sleeve bears on the lower annular surface 10 of this circular flange. On the outer surface of the neck of the ingredients container, at a position below the circular flange 10, there are four arcuate ribs 11 spaced apart, lengthwise along a circular line around the neck. These ribs project out from the neck surface a distance equal to the thickness of the outer sleeve of the valve assembly. At a corresponding position on the outer sleeve of the valve assembly are four circumferential slots 12 of the same length and breadth of the locating ribs, and in which the ribs fit to locate and attach the outer sleeve of the valve on the neck of the ingredients container.

Just above the circular flange 9 on the outer surface of the neck of the ingredients container its wall is thicker and the lower end of the thicker part of the wall defines a narrow shoulder 33 extending around the inner wall of the neck. This shoulder 33 locates the upper circular edge of the blade holder 3; the upper part of the blade holder being located within the neck of the ingredients cartridge and the lower end resting on the fins 7 on the outer sleeve of the valve, as described above.

The blade holder 3 will now be described. In plan view the blade holder presents a circular cross-section conforming to the inner wall of the neck of the ingredients cartridge within which it fits. The blade holder has a complete cylindrical wall only around the upper end of the blade holder, the remainder of the exterior of the blade holder comprises some rectangular, re-entrant walls and some of arcuate cross-section, the latter contacting and conforming with the inner surface of the neck of the ingredients container.

The blade holder encompasses two passages, the first is the dispense passage 13 from the ingredients container and the second is the chamber occupied by the valve blade 4 and the spring 5. These passages are separated by a rectangular partitioning plate, 14 the plane of which extends longitudinally in the cylindrical space within the the attached neck and outer sleeve, from one side to the other and through the axis of the sleeve and neck. The dispense passage is of semicircular cross-section formed on one side of the partitioning plate 14 and defined by a semi-cylindrical wall 15. This semi-cylindrical wall confirms in shape with the inner surface of the neck of the ingredients container and extends longitudinally from the upper circular edge of the blade holder to just below the lower edge of the neck of the ingedients container.

The arcuate lower edge of the semi-cylindrical wall of the blade holder is integral with a downwardly-angled guide wall 16 protruding inwardly towards the plane of the partitioning plate. The downwardly-angled shelf terminates below the lower edge of the partition plate leaving a rectangular aperture 17 between them to form a gate exit for material in the dispensing passage, which when not obturated allows the dispense passage to communicate with the outlet orifice 6.

At its lower horizontal edge the downwwardly-angled guide wall 16 has a narrow horizontal ledge 18 which protrudes beneath and beyond the lower edge of the partitioning plate 14 so that it is beneath chamber occupied by the valve blade 4.

The upper horizontal edge of the partitioning plate 14 is connected to the upper circular rim of the blade holder, by a sloping shelf 19, extending upwardly from the partition plate over the chamber which houses the blade and spring. The upper sloping surface of this shelf constitutes an inclined guide plate for powdered ingredients from the container, directing the flow into the semi-cylindrical dispensing passage 13. Thus the blade holder 3 also serves to shield the blade 4 from contact with the powdered material except where it is used to obturate the aperture 17.

As has been previously stated, the valve holder does not have a continuous cylindrical outer wall. Integral with the semi-cylindrical wall 15 surrounding the dispensing passage is an housing including rectangular walls 20 extending inwardly with respect to the semi-cylindrical wall. This housing has in turn, protruding from its, an outer elongate housing having rectangular side walls 21 perpendicular to the first housing and a rear wall 22 arcuate in cross-section to conform with the inner surface of the neck of the cartridge against which it fits. This arcuate wall 22 extends lengthwise down the inner surface of the neck, and down to a position just below the lower edge of the partitioning plate and the axis of which is in the axial plane perpendicular to the partition plate. These generally rectangular housings are beneath the sloping shelf 19 extending from the top of the partitioning plate 14, and define respectively enclosures for the valve blade and coil-spring.

The elongate arcuate wall 22 of the outer coil-spring housing has a lower horizontal wall 23 at its lower edge. Similarly, it has a further horizontal wall 24 near its upper end which joins the under side of the upper sloping shelf 19. The coil spring 5 is located between these two horizontal walls 23, 24. The upper sloping shelf 19 has on its under surface a short web 25 projecting down into the space enclosed by the inner rectangular housing. The web extends across the valve parallel to the partitioning plate 14.

The valve blade 4 comprises a flat member made from steel and having two rectangular main faces the lower edge of one tapers towards the other to form a knife edge. The blade is located parallel with the partitioning plate 14 and within the inner rectangular housing of the blade holder the respective facing surfaces of which locate the blade and allow it to move vertically so that in one position its knife edge rests on the horizontal ledge 18 extending from the angled guide wall 16. In this position the non-tapered face of the blade closes the outlet gate 17 from the semi-cylindrical dispense passage 13.

The tapered main face of the blade has a pin 26 projecting into the outer housing occupied by the coil spring and on which the lower end of the spring bears. The spring, acting on the pin, forces the knife edge of the blade firmly against the horizontal ledge 18.

The upper circular end of the valve holder which is adjacent the shoulder 33 on the inner surface of the neck of the container receives a circular perforated filter disc 27 through which ingredients from the container must pass and this prevents the powder from packing the valve. The blade holder is formed from two parts which join in a plane extending across the blade and dispense chambers. The two-part construction allows the blade and spring to be inserted into their housings and enclosed when the parts are joined. The parts are held together by their close fit within the neck of the ingredients container.

When the valve is installed, a holder is placed around the outer sleeve 1 which includes a former on which a wire coil is wound.

When the ingredients are required to be dispensed form the container, a periodically varying voltage is applied to the coil. The magnetic field produced as a result causes the steel blade to move upwardly away from the ledge 18 until it contacts the web 25. The variation of the applied voltage causes the blade to reciprocate towards and from the ledge 18 and to vibrate against the web 25. This movement of the blade disturbs the powder at the container outlet and assists the passage of the powdered ingredient through the gate opening 17.

It will be appreciated that if an attempt is made to pilfer ingredients by inserting a probe through the aperture 6 and pushing on the blade 4 this is likely to be unsuccessful, since the tapered blade surface provides little purchase for a probe and the spring biasing of it is unlikely to be overcome by any force which could readily be applied.

I claim:

1. A valve for controlling the dispensation of powdered material from a reservoir, said valve including a valve body comprising:

a conduit for substantially vertical disposition in use and terminating in an aperture;

blade means having a lower edge, said blade means being formed of ferromagnetic material and magnetically reciprocatable along a linear path in a vertical plane between an open position substantially clear of said aperture and a closed position obturating a vertical aperture, a valve seat disposed at a lower side of said vertical aperture within said conduit to abut the lower edge of said blade means when it is in the closed position and guide and shielding means housing said blade means and guiding its vertical sliding motion therewithin while simultaneously shielding all portions of said blade means other than that obturating the aperture from substantial contact with the powdered material.

2. A valve according to claim 1 wherein the blade means is an elongate structure including a lower edge and a pin extending perpendicular to the axis thereof and wherein said valve includes a spring in contact with said pin thereby to spring bias the blade to its close condition.

3. A valve as in claim 1 wherein the conduit comprises a substantially cylindrical member having an internal partition wall to define said conduit and said guide and shielding means, said partition wall having an upper inclined portion terminating in a downwardly depending portion terminating in spaced relationship with said valve seat to define said vertical aperture.

4. A valve as in claim 3 wherein the upper inclined wall includes a web adapted to abut said blade means during movement between said open and closed position and to receive an impact therefrom to assist powder flow over said upper inclined portion of said internal partition wall.

5. A valve as claimed in claim 1 wherein the blade is a flat plate having a substantially horizontally disposed bevelled lower edge, a pin extending laterally of said plate and spring means acting on said pin to bias the blade to the closed position.

6. A valve for controlling the dispensation of powdered material form a reservoir, said valve including a valve body comprising:

a conduit for substantially vertical disposition in use and terminating in an aperture;

blade means magnetically reciprocatable between an open position substantially clear of said aperture and a closed position obturating said aperture, means shielding all portions of said blade means other than that obturating the aperture from contact with the powdered material, and a blade valve seat, the means shielding said blade means including a blade holder means having an upper inclined surface terminating in a downwardly depending, substantially vertically disposed surface, which, in turn, terminates at the top of said aperture which aperture is vertically disposed relative to the blade valve seat disposed below said blade holder means at the lower edge of said aperture.

7. A valve for controlling the dispensation of powdered material from a reservoir, said valve including a valve body comprising:

a conduit for substantially vertical disposition in use and terminating in an aperture;

blade means magnetically reciprocatable between an open position substantially clear of said aperture and a closed position obturating said aperture, and means shielding all portions of said blade means other than that obturating the aperture from contact with the powdered material, the valve body additionally including structure defining a generally horizontal outlet orifice disposed below said valve aperture and wherein said valve aperture is disposed generally vertically and perpendicular to the outlet orifice and is provided with a lower projective ledge to shield, at least partially, the blade from tampering via the outlet orifice.

* * * * *